A. M. GOW.
SIDE DUMP CAR.
APPLICATION FILED APR. 6, 1921.
1,387,485.
Patented Aug. 16, 1921.
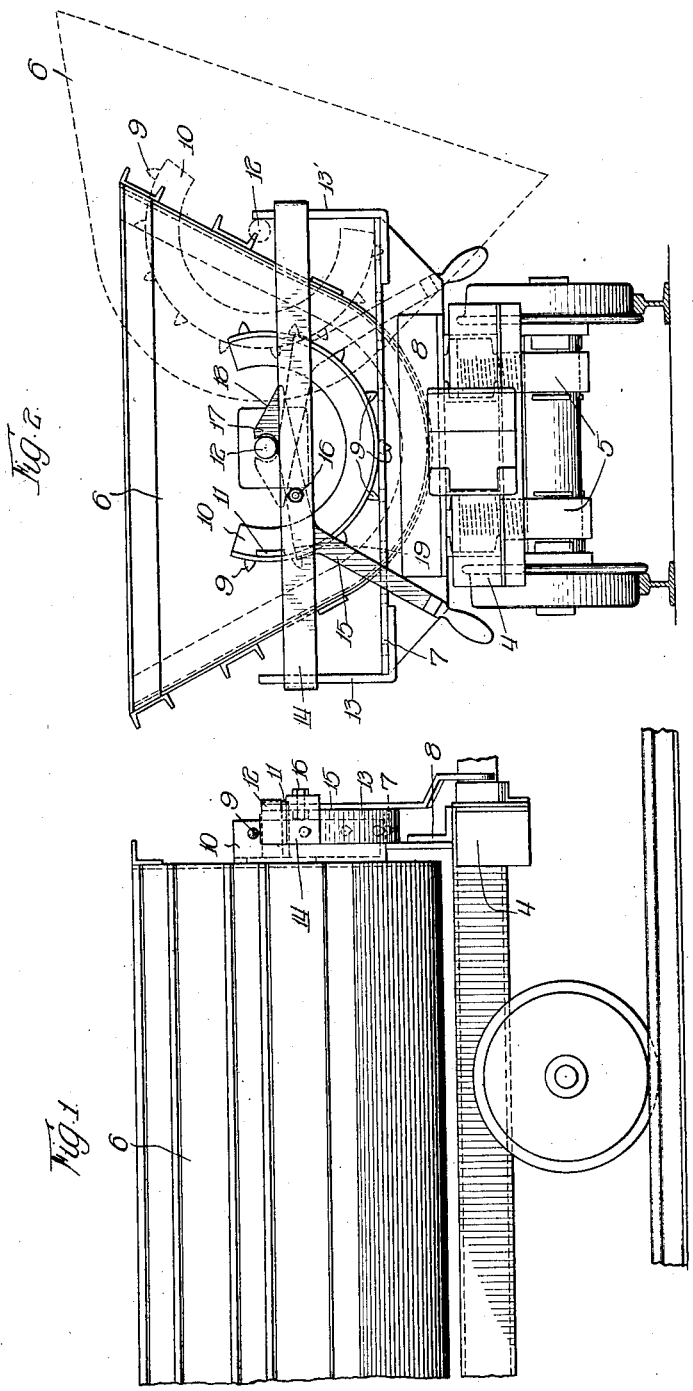
Witness:
R. Burkhardt
Inventor:
Alexander M. Gow,
By L. Anthony Haina
atty.

UNITED STATES PATENT OFFICE.

ALEXANDER M. GOW, OF DULUTH, MINNESOTA.

SIDE-DUMP CAR.

1,387,485.  Specification of Letters Patent.  Patented Aug. 16, 1921.

Application filed April 6, 1921. Serial No. 458,929.

*To all whom it may concern:*

Be it known that I, ALEXANDER M. GOW, a citizen of the United States, residing at Duluth, in the county of St. Louis and State of Minnesota, have invented certain new and useful Improvements in Side-Dump Cars, of which the following is a specification.

This invention relates to a new and improved side dump car, and more particularly to a latch and dumping means especially adapted for use with cars of that type.

Side dump cars, or cars in which the car body itself is rotated or tilted to dump the contents, are generally used in mine work or ore handling, and many types of these cars are relatively small and are adapted for manual dumping. It is highly important that the cars be positively locked against accidental dumping and that they be so designed as to render it impossible to dump them upon the operator. It is also desirable to provide automatic means for locking the car in the upright position after the dump. These cars undergo relatively heavy handling, and it is desirable that the dumping mechanism, as well as the car itself, be composed of comparatively few and relatively rugged parts.

It is an object of the present invention to provide a dump car locking and actuating means of the character described and which is further characterized in that the car is unlocked and dumped by the movement of a single lever.

Other and further objects will appear as the description proceeds.

Broadly, my car comprises a body having sectors attached to each end, and track means upon which the sectors roll in the dumping of the car. A lever adapted in its normal position to engage a lug to retain the car upright is provided and the lever upon movement is adapted to disengage this lug and to engage a second lug upon the car body to rotate the body about this sector. An important advantage lies in the fact that the means are duplicated upon opposite ends of the car, but that the means at each end are only adapted for dumping toward the side opposite to that upon which the actuating lever is located.

I have illustrated a preferred embodiment of my invention in the accompanying drawings, in which—

Figure 1 is a side view showing one end of the car constructed according to my invention; and Fig. 2 is an end view of the car.

As shown in the drawings, the car consists of the frame 4 and truck 5 which may be of usual construction, and of the body 6. The laterally extending bar 7 is secured across either end of the frame by bracket 8 and this bar is perforated to receive the studs 9 located upon the sector 10. This sector is fastened to the end of the body 6 and is provided with the outwardly extending lug 11. The end of the car is provided with the locking lug 12 which is located substantially at the center of the sector 10. The brackets 13 and 13' extend upwardly from opposite ends of the bar 7 and carry the upper bar 14 parallel to the bar 7. To this bar 14 is secured the dumping lever 15 by the bolt 16. This lever is provided adjacent its inner end with an upwardly extending locking portion 17, the outer surface 18 of which is formed upon a cam angle. The opposite portion of the lever is provided with the shoulder 19 adapted to engage the lug 11 upon the sector 10. This mechanism is duplicated upon the opposite end of the car, but in the reverse direction, as indicated in Fig. 2.

In the operation of the car the lever 15 is lifted by its outer end, the first portion of the lift serving to disengage the locking portion 17 from the locking lug 12, which releases the body 6 to permit it to dump to the right, as shown in Fig. 2. As the upward movement continues the shoulder 19 of the lever 15 engages the lug 11 on the sector 10. Further movement now of the lever 15 causes the body to tilt to the right, the studs 9 of the sector 10 coacting with the perforations in the bar 7 to cause the body to move bodily to the right, as well as to rotate.

The formation of the car body is such that with a normal load but a slight movement by the lever is sufficient to so move the load off center that the completion of the dumping movement is accomplished by gravity.

It is to be noted that the lug 12 does not roll upon the upper bar 14, but moves laterally parallel thereto. If desired, the design and distribution of weight in the car body may be made such as to cause the car body to right itself by gravity after dumping, or may be made such as to cause it to remain in the dumped position until manually restored to the other position.

In the movement of the body back to normal or upright position, the sectors roll upon the bar 7 until the lug 12 upon the opposite end of the car engages the locking member upon the lever at that end. This engagement prevents the car going past the center. It will also be noted that in this righting movement the lug 12 engages the cam surface 18 upon the end of the lever 15 and depresses that end of the lever until the lug 12 clears the portion 17 when the body is automatically locked.

It will thus be seen that the locking means and dumping means are actuated by a single movement of the lever, and that they are simple in design and composed of relatively few and rugged parts. The car body is effectively locked in place and cannot be accidentally dumped, and cannot dump toward the side of the dumping operator.

I claim:

1. In a car of the type described, a car frame, a car body adapted to rock to either side of said frame, and duplicate dumping and locking mechanism on opposite ends of the car, the mechanism on one end being adapted to lock the body against movement in one direction and the mechanism on the other end being adapted to lock the body against movement in the opposite direction, each mechanism being adapted to be actuated by a single lever to both unlock and dump the car.

2. In a car of the type described, a car frame, a car body adapted to rock to either side of said frame, and dumping and locking mechanism on opposite ends of the car, the mechanism on one end being adapted to lock the body against movement in one direction and the mechanism on the other end being adapted to lock the body against movement in the opposite direction, each mechanism including means adapted to lock, unlock and dump the car.

3. In a car of the type described, a car frame, a car body adapted to rock to either side of said frame, and duplicate dumping and locking mechanism on opposite ends of the car, the mechanism on one end being adapted to lock the body against movement in one direction and the mechanism on the other end being adapted to lock the body against movement in the opposite direction, each mechanism being adapted to be actuated by a continuous movement in one direction of a single lever to both unlock and dump the car.

4. In a car of the type described, a car frame, a car body adapted to rock to either side of said frame, and duplicate dumping and locking mechanism on opposite ends of the car, the mechanism on one end being adapted to lock the body against movement in one direction and the mechanism on the other end being adapted to lock the body against movement in the opposite direction, the mechanism on each end being adapted to dump the car in one direction.

5. In a car of the type described, a car frame, a car body adapted to rock to either side of said frame, and duplicate dumping and locking mechanism on opposite ends of the car, the mechanism on one end being adapted to lock the body against movement in one direction and the mechanism on the other end being adapted to lock the body against movement in the opposite direction, the mechanism on each end being adapted to dump the car in the direction against which it is locked by said mechanism.

6. In a car of the type described, a car frame, a car body adapted to rock to either side of said frame, and duplicate dumping and locking mechanism on opposite ends of the car, the mechanism on one end being adapted to lock the body against movement in one direction and the mechanism on the other end being adapted to lock the body against movement in the opposite direction, each mechanism including a single lever adapted to lock, unlock and dump the car, said levers being located toward the sides of the car opposite the sides toward which each mechanism locks the body against movement.

7. In a car of the type described, a car frame, a car body adapted to rock to either side of said frame, and duplicate dumping and locking mechanism on opposite ends of the car, the mechanism on one end being adapted to lock the body against movement in one direction and the mechanism on the other end being adapted to lock the body against movement in the opposite direction, the mechanism on each end being adapted to dump the car in the direction against which it is locked by said mechanism, each mechanism including a single lever adapted to lock, unlock and dump the car, said levers being located toward the sides of the car opposite to the sides toward which each mechanism locks the body against movement.

8. In a car of the type described, a car frame, a car body adapted to rock to either side of said frame, and duplicate dumping and locking mechanism on opposite ends of the car, the mechanism on one end being adapted to lock the body against movement in one direction and the mechanism on the other end being adapted to lock the body against movement in the opposite direction, each said mechanism being manually operable to unlock and dump the car body and being adapted to automatically lock said body upon its return to normal position.

9. In a car of the type described, a car frame, a transverse bar at either end of said frame, a car body having arcuate members adapted to support said body upon said transverse bars, and to roll thereon to dump said body, and duplicate dumping and locking mechanism on opposite ends of the car, the mechanism on one end being adapted to lock the body against movement in one direction and the mechanism on the other end being adapted to lock the body against movement in the opposite direction.

10. In a car of the type described, a car frame, a transverse bar at either end of said frame, a car body having arcuate members adapted to support said body upon said transverse bars and to roll thereon to dump said body, and duplicate dumping and locking mechanism on opposite ends of the car, the mechanism on one end being adapted to lock the body against movement in one direction and the mechanism on the other end being adapted to lock the body against movement in the opposite direction, each mechanism including a single lever adapted to lock, unlock and dump the car.

11. In a car of the type described, a car frame, a transverse bar at either end of said frame, a car body having arcuate members adapted to support said body upon said transverse bars and to roll thereon to dump said body, and duplicate dumping and locking mechanism on opposite ends of the car, the mechanism on one end being adapted to lock the body against movement in one direction and the mechanism on the other end being adapted to lock the body against movement in the opposite direction, the mechanism on each end being adapted to dump the car in the direction against which it is locked by said mechanism, each mechanism including a single lever adapted to lock, unlock and dump the car, said levers being located upon the sides of the car opposite the sides toward which each mechanism locks the body against movement.

12. In a car of the type described, a car frame, a transverse bar at either end of said frame, a car body having an arcuate member adapted to support said body upon said transverse bars and to roll thereon to dump said body, a locking lug and a dumping lug on said body, and a combined dumping lever adapted to engage the locking lug to lock the body and to be moved to disengage said lug and to engage the dumping lug to unlock and dump the body.

13. In a car of the type described, a car frame, a transverse bar at either end of said frame, a car body having an arcuate member adapted to support said body upon said transverse bars and to roll thereon to dump said body, a locking lug and a dumping lug on said body, and a combined dumping lever adapted to engage the locking lug to lock the body against movement in one direction and to be moved to disengage said locking lug and to engage the dumping lug to unlock and dump the body in said direction.

14. In a car of the type described, a car frame, a transverse bar at either end of said frame, a car body having an arcuate member adapted to support said body upon said transverse bars and to roll thereon to dump said body, a locking lug and a dumping lug on said body, and a combined dumping lever adapted to engage the locking lug to lock the body and to be moved to disengage said locking lug and to engage the dumping lug to unlock and dump the body, said lever being adapted to automatically engage the locking lug upon the return of the body to normal position to lock the body in such position.

15. In a car of the type described, a car frame, a transverse bar at either end of said frame, a car body having arcuate members adapted to support said body upon said transverse bars, and to roll thereon to dump said body, a locking lug and a dumping lug on said body, and a combined dumping lever adapted to engage the locking lug to lock the body and to be moved to disengage said locking lug and to engage the dumping lug to unlock and dump the body, one of said levers and coacting locking and dumping lugs being located upon each end of the car, said levers locking and dumping in directions opposite to each other.

Signed at Duluth, Minnesota, this 1st day of April, 1921.

ALEXANDER M. GOW.